United States Patent
Berlat et al.

(10) Patent No.: US 11,504,945 B2
(45) Date of Patent: Nov. 22, 2022

(54) ITEMS FORMED USING STITCHING EQUIPMENT WITH ADJUSTABLE-SHAPE FIXTURES

(71) Applicant: Apple Inc., Cupertino, CA (US)

(72) Inventors: Sofiane Berlat, San Francisco, CA (US); Aedhan M. Loomis, Philadelphia, PA (US); Peter F. Coxeter, Sunnyvale, CA (US); Sarah J. Montplaisir, Santa Cruz, CA (US); Timon A. Wright, San Francisco, CA (US); Yohji Hamada, Wakayama (JP); Patrick Perry, Cupertino, CA (US); Chad J. Miller, Los Gatos, CA (US); Andrew L. Rosenberg, Sunnyvale, CA (US); Daniel A. Podhajny, San Jose, CA (US); Daniel D. Sunshine, Sunnyvale, CA (US); Jessica J. Lu, Mountain View, CA (US); Lia M. Uesato, San Jose, CA (US); Donald L. Olmstead, Aptos, CA (US)

(73) Assignee: Apple Inc., Cupertino, CA (US)

( * ) Notice: Subject to any disclaimer, the term of this patent is extended or adjusted under 35 U.S.C. 154(b) by 447 days.

(21) Appl. No.: 16/358,590

(22) Filed: Mar. 19, 2019

(65) Prior Publication Data

US 2019/0344536 A1    Nov. 14, 2019

Related U.S. Application Data

(60) Provisional application No. 62/669,127, filed on May 9, 2018.

(51) Int. Cl.
*B32B 7/09* (2019.01)
*D04B 1/08* (2006.01)
(Continued)

(52) U.S. Cl.
CPC .............. *B32B 7/09* (2019.01); *B29C 66/721* (2013.01); *B29C 70/24* (2013.01); *B32B 5/06* (2013.01);
(Continued)

(58) Field of Classification Search
CPC ...... D05B 35/107; D05B 21/00; D05B 19/14; D05B 7/00; D05B 3/00; B32B 3/266;
(Continued)

(56) References Cited

U.S. PATENT DOCUMENTS

| 2,073,703 A | 3/1937 | Wilmot |
| 2,185,844 A | 1/1940 | Gustav et al. |

(Continued)

FOREIGN PATENT DOCUMENTS

| CN | 1175642 A | 3/1998 |
| CN | 1680644 A | 10/2005 |

(Continued)

OTHER PUBLICATIONS

Needle, Dictionary.com, https://www.dictionary.com/browse/needle (last visited Febraury 15, 2022). (Year: 2022).*

*Primary Examiner* — Alissa L Hoey
*Assistant Examiner* — Patrick J. Lynch
(74) *Attorney, Agent, or Firm* — Treyz Law Group, P.C.; Jason Tsai

(57) ABSTRACT

An item may be formed from structures that include holes. Stitching may be used to form a seam that joins the structures. The stitching may be formed from a chain stitch that passes through the holes. The holes may be formed from loops of knit fabric or other holes. Leather layers, polymer layers, fabric layers, and other structures with holes may be joined using the stitching. During fabrication, a layer of material with holes may be placed on an adjustable-shape fixture having a bed of needles. The shape of the bed of nails
(Continued)

in the adjustable-shape fixture may then be changed. After the fixture has been used to transform the shape of one or more of the structures, the structures may be placed on needles in an assembly fixture and the stitching between the structures may be formed. The item may be an electronic device cover or other item.

20 Claims, 15 Drawing Sheets

(51) Int. Cl.
| D04B 21/20 | (2006.01) |
| D04B 1/22 | (2006.01) |
| D05B 1/06 | (2006.01) |
| D05B 93/00 | (2006.01) |
| B29C 70/24 | (2006.01) |
| B29C 65/00 | (2006.01) |
| A45C 11/00 | (2006.01) |
| B32B 3/26 | (2006.01) |
| B32B 5/06 | (2006.01) |

(52) U.S. Cl.
CPC ............... *D04B 1/08* (2013.01); *D04B 1/22* (2013.01); *D04B 21/20* (2013.01); *D05B 1/06* (2013.01); *D05B 93/00* (2013.01); *A45C 2011/002* (2013.01); *B32B 3/266* (2013.01); *B32B 2262/02* (2013.01); *B32B 2307/202* (2013.01); *B32B 2439/02* (2013.01)

(58) Field of Classification Search
CPC ............ B32B 2307/202; H05K 3/4046; H05K 1/038; H05K 1/118
See application file for complete search history.

(56) References Cited

U.S. PATENT DOCUMENTS

| 3,522,716 | A |   | 8/1970 | Palange |  |
| 3,646,246 | A | * | 2/1972 | Olney, Jr. | H05K 3/222 |
|  |  |  |  |  | 174/251 |
| 3,656,324 | A |   | 4/1972 | Jackson |  |
| 4,373,360 | A |   | 2/1983 | Lonati |  |
| 4,608,939 | A | * | 9/1986 | Lampley | D05C 1/02 |
|  |  |  |  |  | 112/260 |
| 6,230,523 | B1 |   | 5/2001 | Apollonio |  |
| 7,863,731 | B2 |   | 1/2011 | Chen et al. |  |
| 7,975,513 | B2 |   | 7/2011 | Lonati et al. |  |
| 8,245,544 | B2 |   | 8/2012 | Lonati et al. |  |
| 2002/0168813 | A1 | * | 11/2002 | Ogura | H01L 27/115 |
|  |  |  |  |  | 438/200 |
| 2005/0235482 | A1 | * | 10/2005 | Deaett | H01P 11/00 |
|  |  |  |  |  | 29/600 |
| 2008/0066306 | A1 | * | 3/2008 | Bernardini | H01B 1/124 |
|  |  |  |  |  | 29/877 |
| 2008/0196783 | A1 | * | 8/2008 | Van Bruggen | D03D 1/0088 |
|  |  |  |  |  | 139/319 |
| 2009/0007830 | A1 | * | 1/2009 | Sakuma | D05B 61/00 |
|  |  |  |  |  | 112/475.17 |
| 2010/0208445 | A1 | * | 8/2010 | Asvadi | H05K 1/038 |
|  |  |  |  |  | 442/206 |
| 2011/0146017 | A1 |   | 6/2011 | Wildeman |  |
| 2012/0040150 | A1 |   | 2/2012 | Manninen |  |
| 2014/0317920 | A1 | * | 10/2014 | Vanderleeden | H01M 8/0271 |
|  |  |  |  |  | 29/852 |
| 2014/0343390 | A1 |   | 11/2014 | Berzowska et al. |  |
| 2015/0059209 | A1 |   | 3/2015 | Dekovic et al. |  |
| 2015/0223552 | A1 |   | 8/2015 | Love et al. |  |
| 2016/0194792 | A1 | * | 7/2016 | Satharasinghe | H05K 1/038 |
|  |  |  |  |  | 428/102 |
| 2016/0358849 | A1 | * | 12/2016 | Jur | H01L 35/28 |
| 2017/0181276 | A1 | * | 6/2017 | Sawada | B32B 15/14 |
| 2018/0330886 | A1 | * | 11/2018 | Gisby | H01G 5/04 |
| 2019/0006863 | A1 | * | 1/2019 | Camacho Perez | H02J 50/001 |
| 2019/0257015 | A1 | * | 8/2019 | Harnett | H05K 3/00 |
| 2020/0115828 | A1 | * | 4/2020 | English | B32B 27/40 |

FOREIGN PATENT DOCUMENTS

| CN | 102049883 A | 5/2011 |
| CN | 104819734 A | 8/2015 |
| CN | 105164327 A | 12/2015 |
| CN | 105593077 A | 5/2016 |
| CN | 106473256 A | 3/2017 |
| CN | 107257869 A | 10/2017 |
| CN | 107338572 A | 11/2017 |
| DE | 19935408 A1 | 2/2001 |
| WO | 2011009112 A3 | 1/2011 |

* cited by examiner

ITEMS FORMED USING STITCHING EQUIPMENT WITH ADJUSTABLE-SHAPE FIXTURES

This application claims the benefit of provisional patent application No. 62/699,127, filed May 9, 2018, which is hereby incorporated by reference herein in its entirety.

FIELD

This relates generally to items formed from automated assembly equipment and, more particularly, to items such as fabric-based items having pieces of material with holes that are stitched together using stitching equipment with adjustable-shape fixtures.

BACKGROUND

Items such as covers for electronic devices may have layers of fabric and other material. It can be challenging to assemble layers of material to form an item. If care is not taken, assembly operations can be hampered by difficulties in aligning layers of material and in forming joints between the layers.

SUMMARY

An item may be formed from structures that include holes. The structures that include holes may include layers of fabric, leather, plastic, or other materials. Stitching may be used to form a seam that joins the structures. The stitching may be formed from a chain stitch or other stitch that passes through the holes in each of the structures being joined.

In some arrangements, the layers being joined may be fabric layers such as knit layers. Loops in the knit layers of fabric may form the holes. An electronic device cover may be formed by joining first and second knit layers. The first knit layer may be a rectangular planar knit layer that forms a rear wall of the cover and the second knit layer may be formed from a strip of knit fabric that is bend into a rectangle to forms a rectangular sidewall of the cover.

During fabrication, a layer of material with holes may be placed on an adjustable-shape fixture having a bed of needles. The shape of the adjustable-shape fixture and layer of material may then be changed. For example, computer-controlled positioning equipment may adjust the positions of links supporting the bed of needles in two or three dimensions. After the adjustable-shape fixture has been used to transform the shape of one or more of the structures, the structures may be placed on needles in an assembly fixture and the stitching between the structures may be formed with a computer-controlled stitching head.

DETAILED DESCRIPTION

Figure 1:
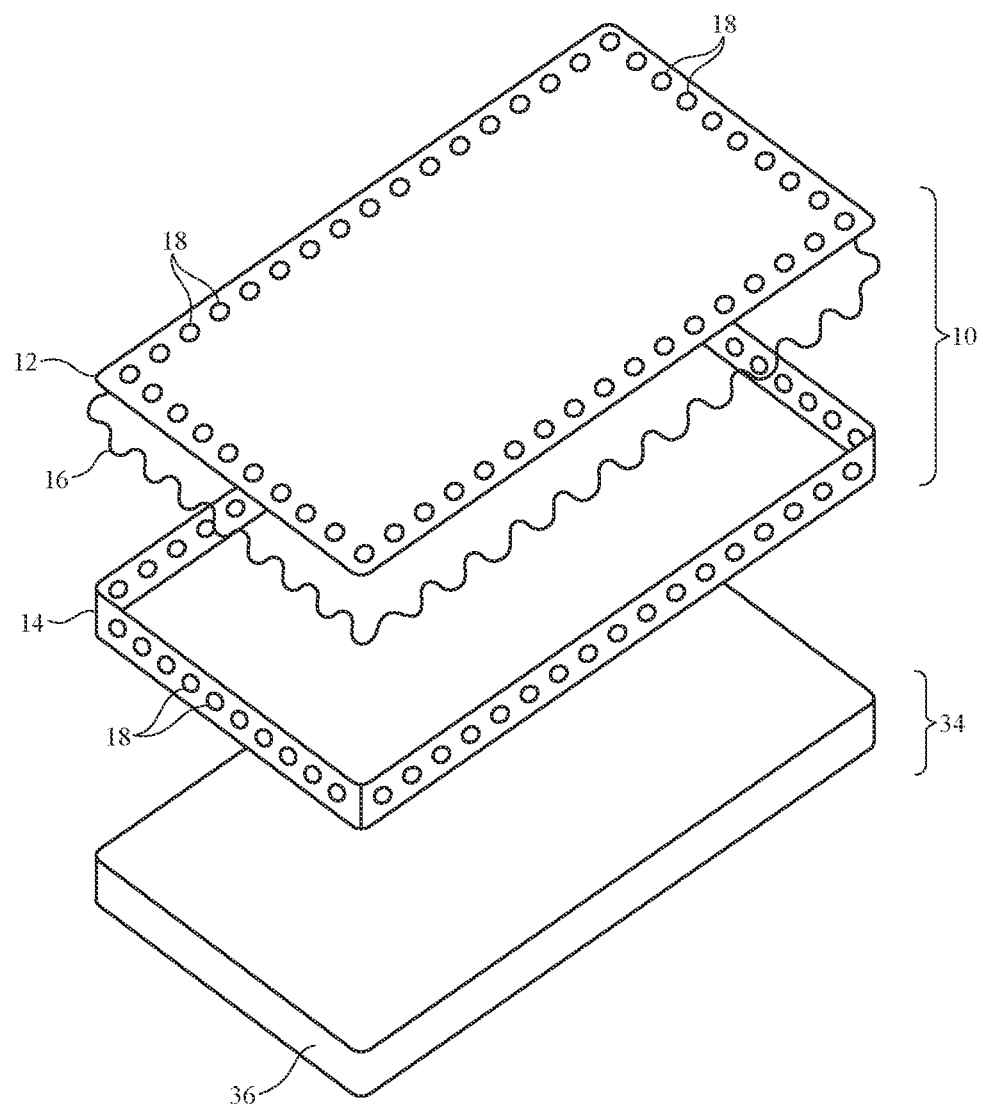
FIG. 1 is an exploded perspective view of an illustrative electronic device and a cover for the electronic device in accordance with an embodiment.

Items such as item 10 of FIG. 1 may include fabric and other materials with holes. In the example of FIG. 1, item 10 is a cover for an electronic device such as device 34. Device 34 may be a cellular telephone, tablet computer, laptop computer, or other electronic equipment. Item 10 may be formed from one or more pieces of material (fabric, polymer, metal, leather, and/or other materials). Item 10 may, as an example, have a planar portion forming rear wall 12 (e.g., a planar layer with a rectangular outline) and a sidewall portion formed from rectangular ring-shaped sidewall 14. The portions of item 10 that have holes 18 (e.g., wall 12 and/or sidewall 14) may be formed from fabric, knit fabric, woven fabric, leather, polymer, metal, glass, ceramic, wood, other materials, and/or combinations of these materials. The materials in the portions of item 10 that have holes may be layers of material, may include two or more stacked layers of material, may be solid structures (e.g., spheres, box-shaped members, etc.), and/or may have other suitable shapes.

During assembly operations, rear wall 12 may be attached to sidewall 14 using stitching. The stitching may be formed using one or more strands of material. A stitching tool such as a computer-controlled stitching head may be used in forming a seam (e.g., stitching) between rear wall 12 and sidewall 14. Any suitable stitch types may be formed from each strand of material. As an example, stitch 16 of FIG. 1 may be a chain stitch that links holes 18 in rear wall 12 to holes 18 in sidewall 14.

Item 10 may be a case for an electronic device, may form part of an electronic device, may form an item of clothing, may form a wearable electronic device, or other suitable items. In some arrangements, item 10 and/or device 34 may include equipment such as a voice-controlled electronic device (sometimes referred to as a digital assistant or voice-controlled speaker), a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based item 10 is mounted in a kiosk, in an automobile, airplane, or other vehicle, other electronic equipment, or equipment that implements the functionality of two or more of these devices. If desired, item 10 may be a removable external cover (case) for electronic equipment, may be a strap, may be a wrist band or head band, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, shirt, pants, shoes, etc.), or may be any other suitable fabric-based item. In the illustrative configuration of FIG. 1, item 10 is a removable cover (case) for an electronic device such as a cellular telephone or tablet computer. In general, item 10 may be any other suitable structure or equipment with holes joined by stitching. The configuration of FIG. 1 is presented as an example.

As shown in FIG. 1, device 34 may have a rectangular housing such as housing 36. Housing 36 may have opposing front and rear faces and may have a sidewall that surrounds the front and rear faces. In the example of FIG. 1, housing 36 has a rectangular outline and is received in a corresponding rectangular recess formed by rear housing wall 18 and peripheral sidewall 14 of item 10. Item 10 (and/or device 34) may include circuitry (e.g., control circuitry formed from integrated circuits and other circuitry, sensors, input-devices such as buttons, and output devices such as speakers, displays, light-emitting diodes, haptic output devices, batteries, a connector for coupling item 10 and device 34, etc.).

Figure 2:
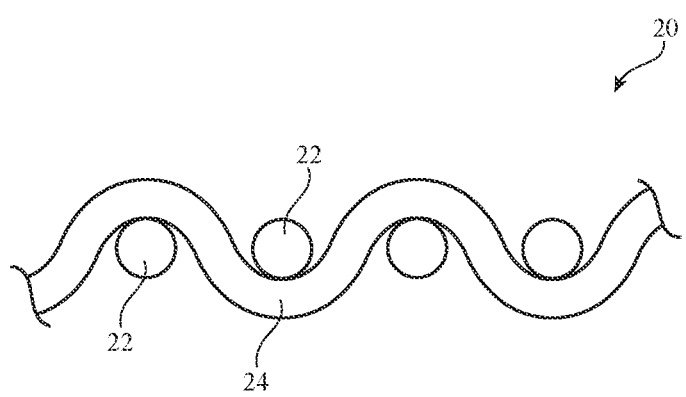
FIG. 2 is a cross-sectional side view of a layer of woven fabric in accordance with an embodiment.

Fabric for item 10 may be formed using intertwined strands of material (e.g., woven fabric, knit fabric, braided fabric, and/or other intertwined strands). FIG. 2 is a side view of illustrative woven fabric.

As shown in FIG. 2, woven fabric 20 may include strands of material such as warp strands 22 and weft strands 24. The strands of material that are intertwined to form the fabric for item 10 may be monofilaments and/or multifilament yarns. Strands of material may be insulating or conductive. Polymers, metal, glass, and/or other materials may be used in forming the strands. Openings in woven fabric 20 may form holes such as holes 18.

Figure 3:
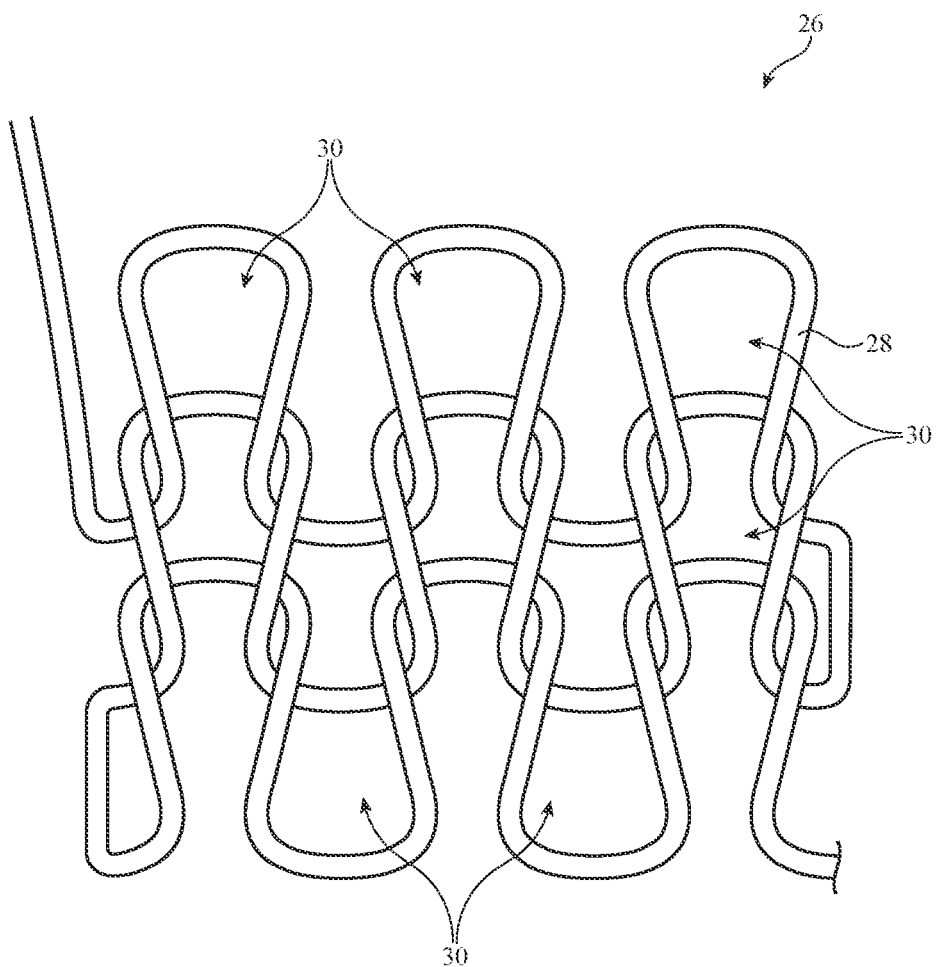
FIG. 3 is a top view of a layer of knit fabric in accordance with an embodiment.

FIG. 3 is a top view of illustrative knit fabric. As shown in FIG. 3, knit fabric 26 may include knit loops of strands 28. Openings 30 in the loops formed by strands of material such as strands 28 in knit fabric 26 may form holes such as holes 18 of FIG. 1.

Fabric openings may be formed during strand intertwining operations (e.g., during weaving, knitting, braiding, etc.) and/or may be formed using hole formation equipment after strand intertwining operations are complete. If desired, item 10 may include one or more non-fabric structures (e.g., layers of plastic, metal, and/or other materials). Hole formation techniques that may be used in processing layers of fabric and/or other layers of material for item 10 to form holes 18 include drilling, stamping, laser cutting, laser drilling, molding, and/or other hole formation techniques.

Figure 4:
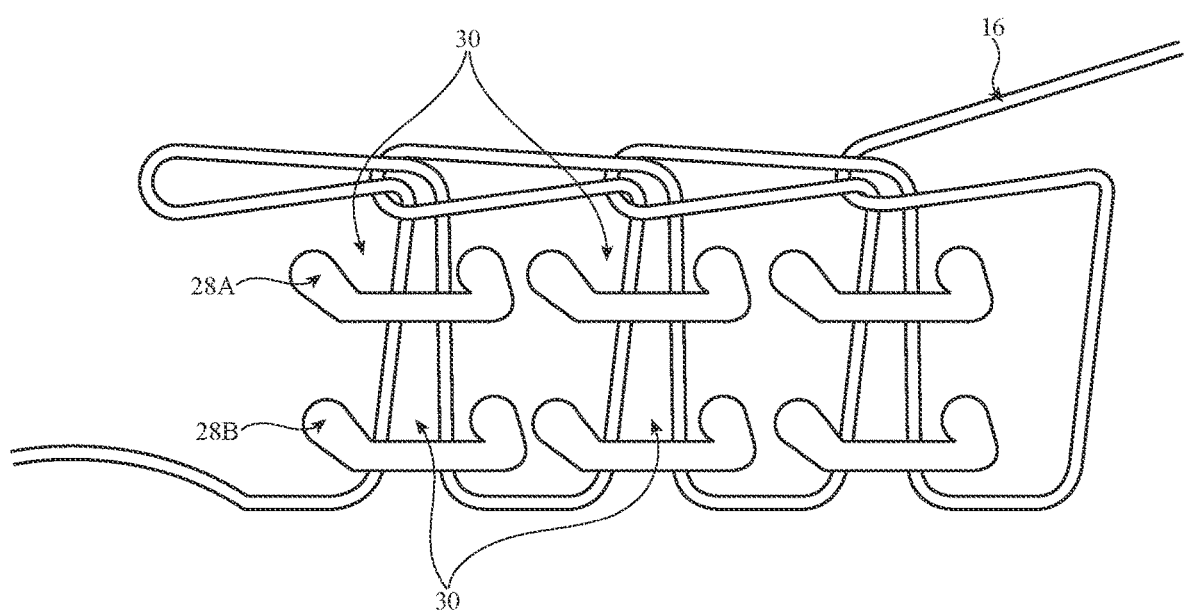
FIG. 4 is a cross-sectional side view of two layers of fabric with openings being linked using a chain stitch in accordance with an embodiment.

A stitching (sewing) head may be used in forming a chain stitch or other stitching 16 to link pieces of material with holes 18 together to form item 10. An illustrative chain stitch is shown in the cross-sectional side view of FIG. 4. In the example of FIG. 4, a first layer of fabric has strands 28A (e.g., knit strands forming openings 30 that serve as holes 18) and a second aligned layer of fabric has strands 28B (e.g., knit strands forming openings 30 that serve as holes 18 and that are aligned with the openings 30 of the first layer of fabric). Stitching 16 of FIG. 4 is a chain stitch that loops into and out of each opening 30 (e.g., each hole 18 in both the first fabric layer and the second fabric layer), thereby forming a stitched seam between the first and second fabric layers.

Figure 5:
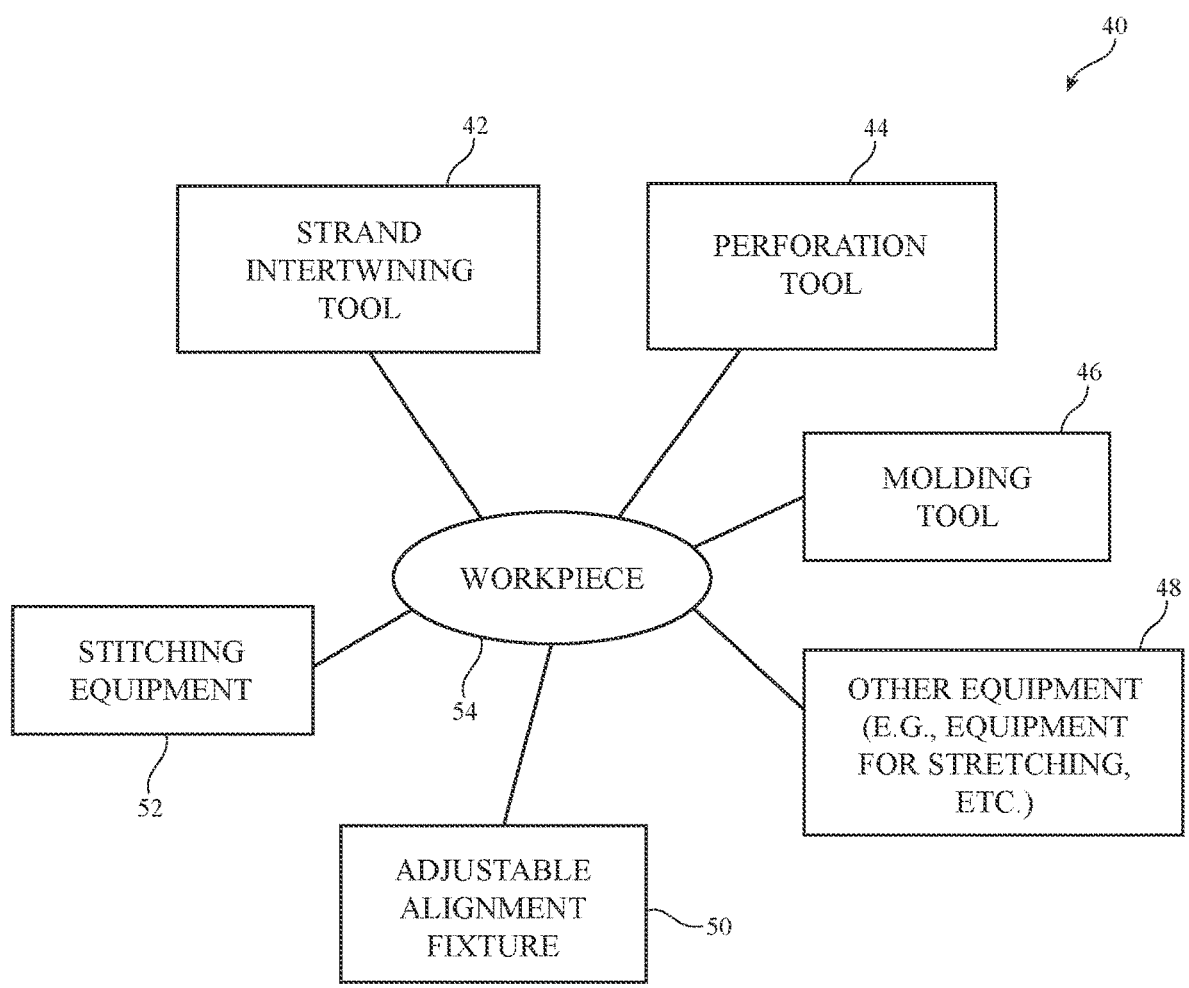
FIG. 5 is a system diagram of an illustrative system with equipment for forming items with holes linked by stitches in accordance with an embodiment.

FIG. 5 is a diagram of an illustrative system for forming items such as item 10 from structures having holes. As shown in FIG. 5, system 40 may include equipment such as strand intertwining tool 42. Tools such as tool 42 may form fabric by weaving, knitting, braiding, or other strand intertwining techniques. Holes 18 may be formed in fabric during strand intertwining operations (see, e.g., the loops formed in knit fabric 26 of FIG. 3) and/or may be formed after fabric formation. Perforation tool 44 may be used in forming holes 18 in fabric and other layers of material (polymer layers, metal layers, glass layers, leather layers, layers of other natural material, ceramic layers, etc.). Perforation tool 44 may include a laser for laser hole drilling, a stamp (e.g., a punch) to form holes by stamping, mechanical drilling equipment, equipment for melting holes in thermoplastic material (e.g., heated pins), and/or other hole formation equipment. Molding tool 46 may be used in forming a polymer structure for item 10. Holes 18 may be incorporated into the polymer structure during molding operations and/or may be formed after molding (e.g., using perforation tool 44).

Stitching equipment 42 may include a stitching head for forming chain stitches and other sewn seams. The strands of material that are used for forming stitches pass through holes 18. Holes 18 in different structures (e.g., fabric layers, polymer layers, layers of leather, other structures formed from fabric, leather, polymer, metal, glass, etc.) may be aligned to each other using one or more fixtures. These fixtures may include, for example, one or more fixtures with a bed of needles onto which a structure with holes 18 may be placed. Each needle in a bed of needles fixture may, as an example, pass through a respective hole 18. As shown in FIG. 5, system 40 may include one or more adjustable fixtures such as adjustable-shape fixture 50. Fixture 50 may have a bed of needles with an adjustable shape.

If desired, system 40 may include additional equipment such as equipment 48. In forming item 10, equipment 48 and the other equipment of FIG. 5 may operate on layers of fabric, leather layers, polymer layers, other layers of material, structures formed from polymer, metal, glass, ceramic, natural materials such as wood and leather, other materials, and/or combinations of these materials (shown as workpiece 54 in FIG. 5). These operations may be performed in a variety of orders (e.g., before hole formation and/or after hole formation, before structures with holes are placed onto alignment structures such as alignment pins in a fixture and/or after the structures are mounted in a fixture, before a fixture's shape is changed or after a fixtures shape is changes, before or after stretching operations are performed, etc. In general, any suitable order may be used for these processing steps when forming item 10.

Equipment 48 may include equipment for stretching or folding a layer of fabric or other structures, may include equipment for depositing material (e.g., using techniques such as painting, spraying, dipping, printing, electrochemical deposition, physical vapor deposition, molding, etc.), may include equipment for removing material from a layer of fabric or other structure (e.g., drilling equipment, laser processing equipment, dry and/or wet chemical etching equipment, stamping tools, cutting blades and other cutting equipment, machining tools, etc.).

Stitching equipment 42 and/or any of the other equipment of system 40 may include computer-controlled (robotic) equipment (e.g., actuators such as electromagnetic actuators and other actuators, motors, etc.) and/or manually actuated equipment. For example, computer-controlled positioners may be used to move a stitching head in equipment 52 along a seam that is being formed, robotic arms may include computer-control positioners with optional computer-controlled grippers to move fixtures, computer-controlled equipment may be used in weaving, knitting, and braiding fabric, computer-controlled positioners may move cutting tools and laser processing equipment, computer-controlled positioners may move perforation tool 44, computer-controlled positioners may move needles and/or needle support structures in fixture 50 and/or other fixtures, computer-controlled positioners may move stretching members apart when stretching fabric with equipment 48, computer controlled-positioners may control the movement of other structures in equipment 48, and/or other equipment in system 40 may be provided with computer-controlled positioning equipment.

Figure 6:
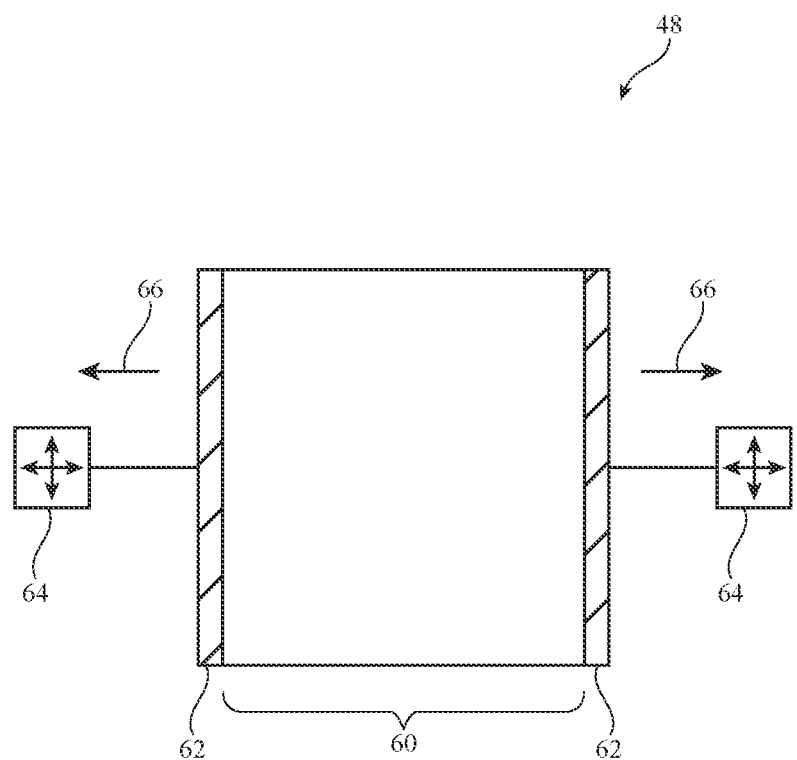
FIG. 6 is a diagram of illustrative stretching equipment in accordance with an embodiment.

Illustrative equipment 48 for stretching material such as fabric is shown in FIG. 6. As shown in FIG. 6, structure 60 (e.g., a layer of fabric or other material) may be held along its left and right edges by holding members 62. Members 62 may be grippers, may be rods that are inserted into tubular fabric channels in structure 60, and/or may be other structures for holding the edges of structure 60. During stretching operations, one or more computer-controlled positioners such as positioners 64 may be used to stretch structure 60 outwardly in directions 66. Equipment of the type shown in FIG. 6 may be used to fold fabric and other materials, may bend fabric layers and other structures into desired curved shapes, and/or may otherwise manipulate structures in workpiece 54 (FIG. 5).

Figure 7:
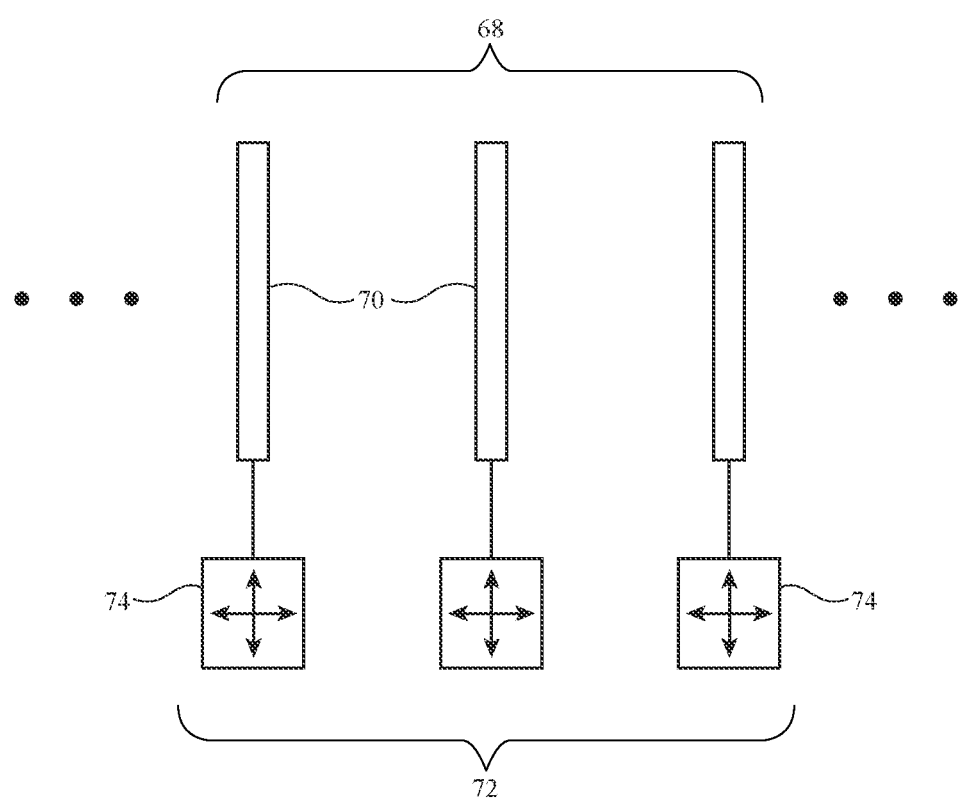
FIG. 7 is a side view of illustrative equipment with adjustable needles in accordance with an embodiment.

Needles and other alignment structures in system 40 may be used to engage holes 18 in the structures being processed to form item 10. In some situations, needles may be used as part of an intertwining tool (e.g., in a knitting machine or other fabric producing equipment) or may be used in a rigid fixture. In other situations, needles may be used in an adjustable-shape fixture such as fixture 50. FIG. 7 shows how a set 68 of needles 70 (sometimes referred to as a bed of needles) may be controlled using computer-controlled positioning equipment 72. There may be any suitable number of needles 70 in set 68 (e.g., at least 5, at least 20, at least 80, at least 200, at least 400, fewer than 500, fewer than 250, fewer than 100, fewer than 50, or other suitable number.

Positioning equipment 72 may include a least one computer-controlled positioner 74. In some configurations, each needle 70 or each subset of multiple needles 70 may be controlled by a respective independently controlled positioner 74. In other configurations, all of needles 70 may be linked together on a rigid platform or a flexible support. Needles 70 (e.g., needles in a fixture) may, if desired, be moved within system 40 using computer-controlled transfer arms or other robotic positioning equipment. In some situations, the needles 70 in one system (e.g., needles in an intertwining tool or a separate fixture) may be aligned with needles 70 in another system. For example, each needle 70 in a first set of needles may be temporarily mated with a corresponding needle 70 in a second set of needles. Following this needle mating operation, material with holes 18 can be transferred between the first set of needles and the second set of needles (e.g., by sliding the material with holes 18 along the lengths of the mated needles). When placed on an adjustable-shape set of needles (see, e.g., fixture 50), the shape of a fabric layer or other structure with holes 18 and the shape of the seam that is subsequently formed can be altered (e.g., in two-dimensions and/or in three-dimensions). Stitching equipment 52 may be used to form chain stitches and/or other stitches to link different layers of fabric other structures with holes 18 together while these structures are aligned using a common set of needles 70 in an alignment fixture.

An illustrative process for forming an item such as item 10 of FIG. 1 or other item having structures with holes 18 is shown in FIGS. 8-16. The operations of FIGS. 8-16 may, if desired, be performed in different orders and/or steps in these operations may be omitted (e.g., fewer fixtures may be used). The operations of FIGS. 8-16 are presented as examples.

The equipment used in connection with FIGS. 8-16 includes needles (e.g., needles 70 of FIG. 7) that form fixed and/or adjustable portions of the equipment of system 40. In the example of FIGS. 8-16, structures with holes 18 are assembled together while using these needles for alignment. Stitching equipment 52 may then form stitches that join the structures together to form item 10. In the example of FIGS. 8-16, the structures that are being joined together are layers of material (e.g., fabric layers, polymer layers, etc.). Other types of structures with holes may be joined, if desired.

Figure 8:
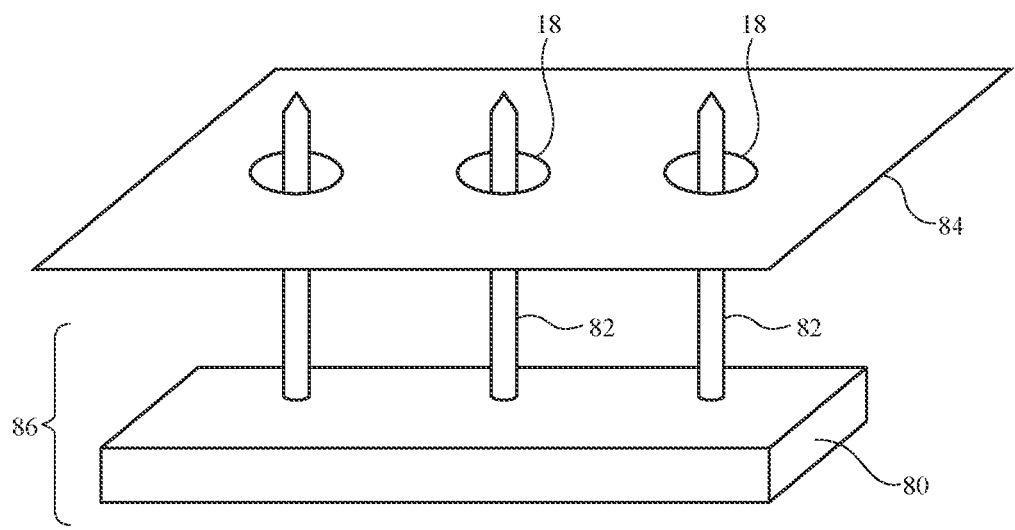
FIG. 8 is a side perspective view of illustrative equipment configured to form material such as fabric with holes in accordance with an embodiment.

As shown in FIG. 8, layer 84 (e.g., a layer of fabric, etc.) may be formed on equipment 86. Equipment 86 may include needles 82 that pass through holes 18 in layer 84. Support structure 80 may include computer-controlled positioners, mechanical linkages, fixed support structures, and/or other equipment for supporting needles 82. In one illustrative configuration layer 84 may be a layer of fabric for item 10 (e.g., a flat knit layer for forming a rear wall such as wall 12 of FIG. 1 or a strip-shaped circular knit fabric layer for forming a sidewall such as sidewall 14), equipment 86 may be knitting equipment (see, e.g., strand intertwining tool 42 of FIG. 5), and needles 82 may be knitting needles in the knitting equipment. If desired, layer 84 may be felt, leather, polymer, metal, glass, ceramic, wood, other materials, and/or combinations of these materials and may be a structure with pre-formed holes 18, a structure where holes 18 are formed during the process of placing material on needles 82, and/or other structures.

Figure 9:
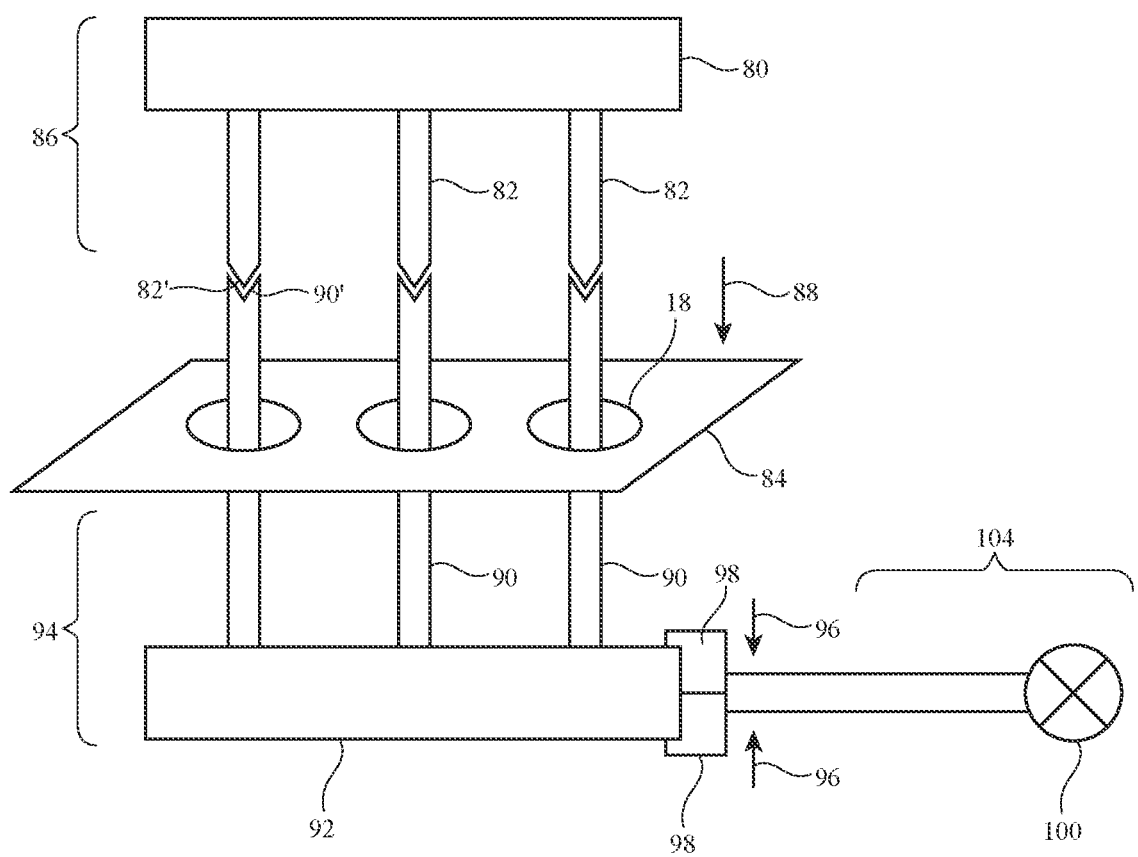
FIG. 9 is a side view of illustrative equipment with needles transferring a layer of fabric with holes or other material with holes to an associated transfer fixture with needles in accordance with an embodiment.

After performing knitting operations or other operations to form layer 84 of FIG. 8, needles 82 may be aligned with corresponding needles in equipment such as fixture 94 of FIG. 9. Fixture 94 may include support structures 92 and needles 90. Each of needles 90 and the other needles used in system 40 may have a tip with engagement features. As an example, each of needles 90 may have a tip 90' that is configured to mate with a corresponding tip 82' of one of needles 82 in equipment 86. A computer-controlled transfer arm and/or other equipment (e.g., computer-controlled positioners separate from equipment 86 or part of equipment 86) may be used in mating needles 82 with needles 90.

As shown in FIG. 9, when needles 82 and needles 90 have been temporarily joined together at their tips, layer 84 may be pushed in direction 88 (e.g., by computer-controlled equipment). This causes layer 84 (and holes 18) to slide off of needles 82 and onto needles 90 in fixture 94. Once layer 84 has been transferred to fixture 94 in this way, equipment 86 may be removed.

Computer-controlled positioning equipment may place needles 90 of fixture 94 into alignment with needles in an adjustable fixture such as adjustable-shape fixture 50 of FIG. 5. The computer-controlled positioning equipment may be, for example, a computer-controlled transfer arm such as arm 104 of FIG. 9. Arm 104 may include computer-controlled positioner 100 for rotating and/or translating arm 104 and may include an adjustable gripper configured to grip support structure 92 of fixture 94. When it is desired to move fixture 94 into alignment with adjustable-shape fixture 50, gripper structures 98 of the adjustable gripper may be moved in directions 96 to grip support structure 92 (as an example). This type of computer-controlled positioning equipment may be used to move rigid fixtures, adjustable fixture 50, and/or other equipment (e.g., equipment with needles, etc.) in system 40.

Figure 10:
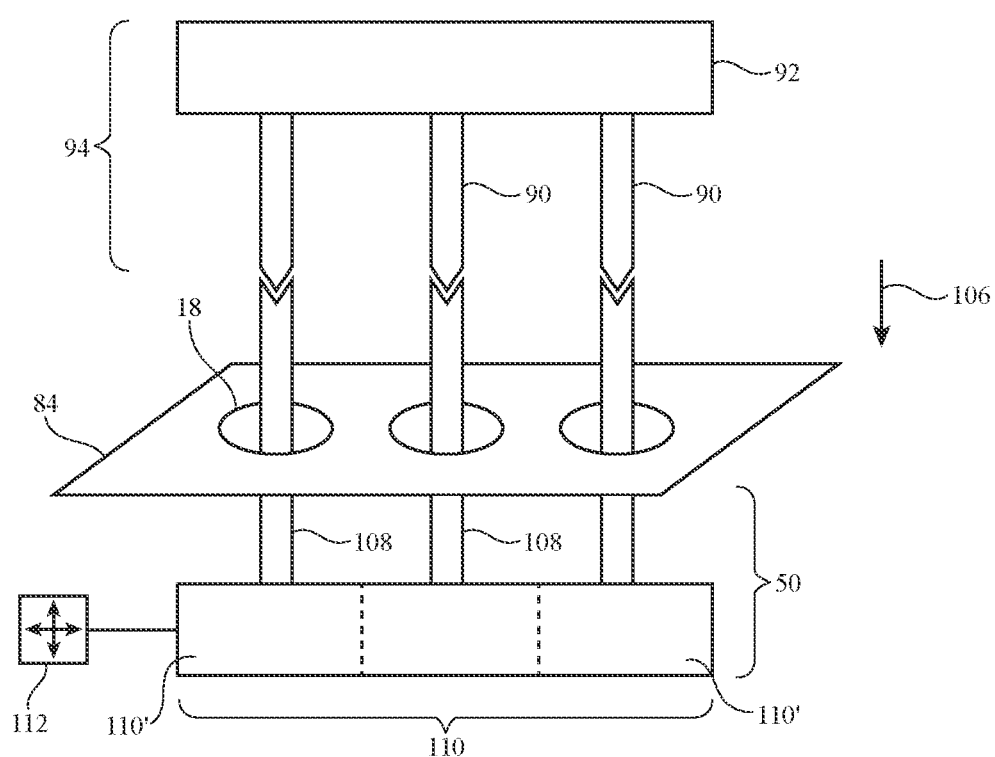
FIG. 10 is a side view of an illustrative adjustable-shape fixture with a bed of needles that is receiving a layer of material with holes from the transfer fixture of FIG. 9 in accordance with an embodiment.

Operations associated with aligning needles 90 of fixture 94 to needles 108 in adjustable fixture 50 are shown in FIG. 10. As shown in FIG. 10, once needles 90 have been mated with corresponding needles 108 in adjustable fixture 50 (e.g., using a computer-controlled positioner), layer 84 may be slid in direction 106 from needles 90 onto needles 108 of fixture 50. Fixture 94 may then be removed.

Fixture 50, which may sometimes be referred to as an adjustable-shape fixture, may have an adjustable support structure such as adjustable support structure 110. Support structure 110 may have portions 110' that can move with respect to each other. Needles 108 may be supported by portions 110'. There may be a single needle 108 for each portion 110' or multiple needles 108 may be attached to each portion 110'. Portions 110', which may sometimes be referred to as links, may be joined by mechanical linkages, flexible hinges (e.g., hinge structures that can bend and/or stretch to accommodate changes in the pitch of portions 110'), ball joints, and/or other flexible coupling structures. One or more computer-controlled positioners such as positioner 112 may be used to adjust the relative positions between one or more of portions 110' and thereby adjust the overall shape of fixture 50 and the bed of needles 108 supported by adjustable-shape support structure 110 of fixture 50.

Figure 11:
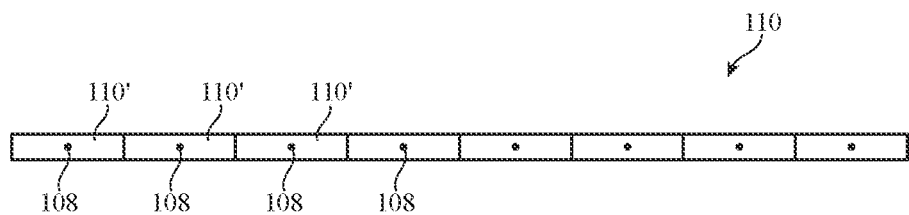
FIG. 11 is a top view of an illustrative adjustable-shape fixture in a configuration with a straight set of needles in accordance with an embodiment.
Figure 12:
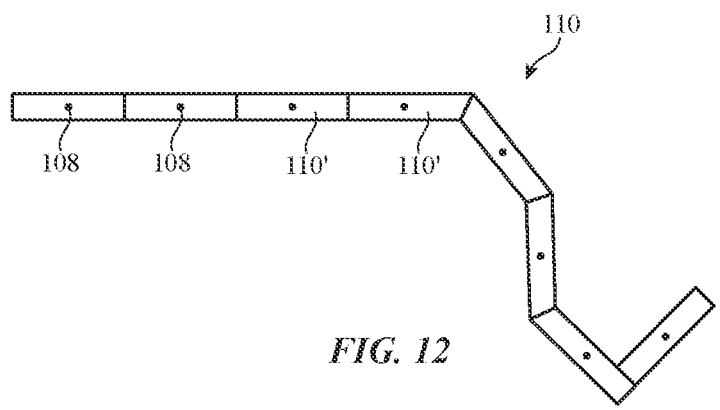
FIG. 12 is a top view of the illustrative fixture of FIG. 11 following bending in accordance with an embodiment.
Figure 13:
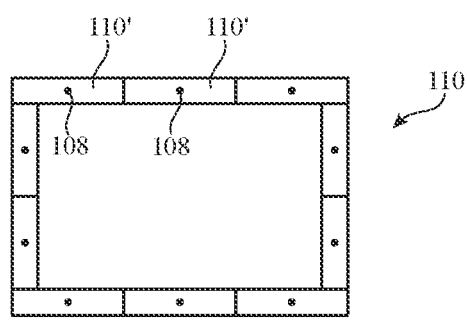
FIG. 13 is a top view of the illustrative fixture of FIG. 11 following adjustment to form a rectangular bed of needles in accordance with an embodiment.

Illustrative two-dimensional fixture shape changing operations for structure 110 are shown in FIGS. 11, 12, and 13. In the example of FIG. 11, portions 110' of structure 110 have been placed in a straight line so that needles 108 are placed in a straight line. This type of arrangement may be used, for example, when needles 108 are receiving a planar layer of fabric with holes 18. After receiving the structure with holes on needles 108, the locations of needles 108 may be changed by changing the shape of fixture 50. For example, curves may be formed in structure 110 as shown in FIG. 12 and/or structure 110 may be placed in a rectangular shape, as shown in FIG. 13.

Figure 14:
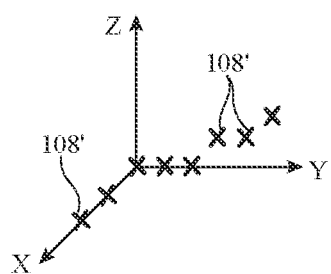
FIG. 14 is a graph showing how the adjustable-shape fixture may be adjusted to place the bed of needles in a desired three-dimensional shape in accordance with an embodiment.

FIG. 14 shows needle tip positions for needle tips 108' of adjustable fixture 50 in a configuration in which fixture 50 has been adjusted to place tips 108' in an illustrative three-dimensional shape (e.g., a line curved about multiple non-parallel axes or other shape that necessarily lies in more than one plane because the smallest number of planes that contain the shape is greater than one). In this type of arrangement, the positions of needle tips 108' may have straight portions, curved portions, and/or other portions that form three-dimensional shapes (e.g., shapes in which needle tips 108' have various different locations along the X, Y, and Z axes of FIG. 14. If desired, adjustable-shape fixture 50 may be adjusted (e.g., using computer-controlled positioning equipment such as positioner 112 of FIG. 10) to form other desired three-dimensional shapes (e.g., lines that are spiral in shape, grids of lines following the outer surface of a sphere, etc.). The configuration of FIG. 14 is merely illustrative.

Figure 15:
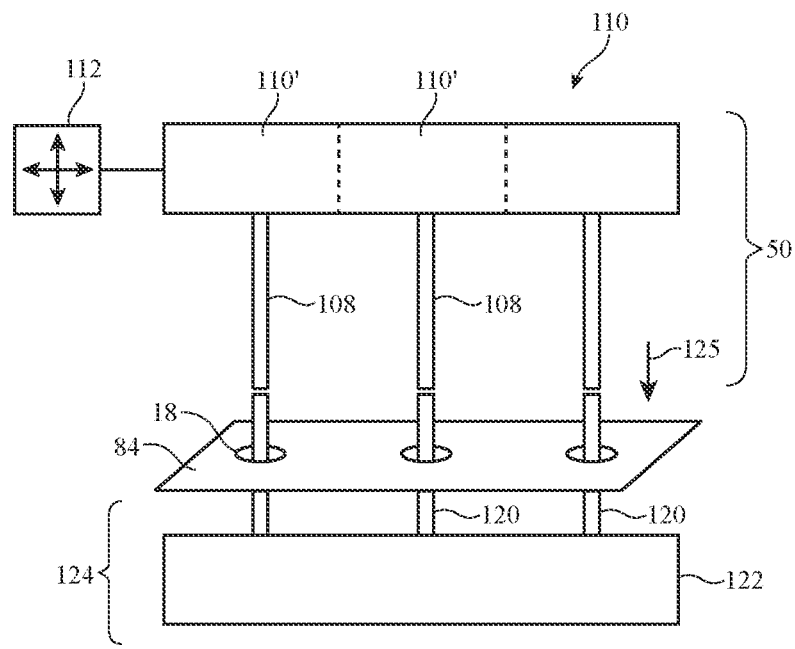
FIG. 15 is a side view of an illustrative adjustable-shape fixture such as the fixture of FIG. 10 during transfer operations in which the needles of the adjustable-shape fixture are aligned with the needles in an illustrative non-adjustable fixture in accordance with an embodiment.

After adjusting the shape of adjustable-shape fixture (bed of needles) 50, fixture 50 may be aligned with a rigid fixture such as fixture 124 of FIG. 15. This frees up fixture 50 for use in making shape changes for other workpieces.

As shown in FIG. 15, fixture 124 may include a bed of needles 120 on support structure 122. Needles 108 of fixture 50 may be aligned and mated with needles 120 of fixture 124. Following mating, structure 84 may be moved in direction 125, so that holes 18 of structure 84 slide from needles 108 to needles 120. Fixture 50 may then be removed and used elsewhere in system 40.

One or more structures with holes 18 may be placed on desired needles 120 of fixture 124 in this way (e.g., a single layer of fabric or other material, two layers of fabric or other material, three layers of fabric or other materials, etc.). For example, if first and second layers of fabric are being linked with stitches, the first and second layers of fabric may be placed on needles 120 so that the holes 18 in the first layer of fabric overlap appropriate holes 18 in the second layer of fabric. Each of these layers may be optionally processed with the tools in system 40 before being placed on needles 120. The operations may include stretching with stretching equipment in equipment 48, forming perforations with tool 44, manual manipulation, transfer operations or other movements using transfer arms and/or other computer-controlled positioners, patterning with metal traces using deposition equipment, etching equipment, and/or other processing tools, and/or other tools, and/or other operations.

Figure 16:
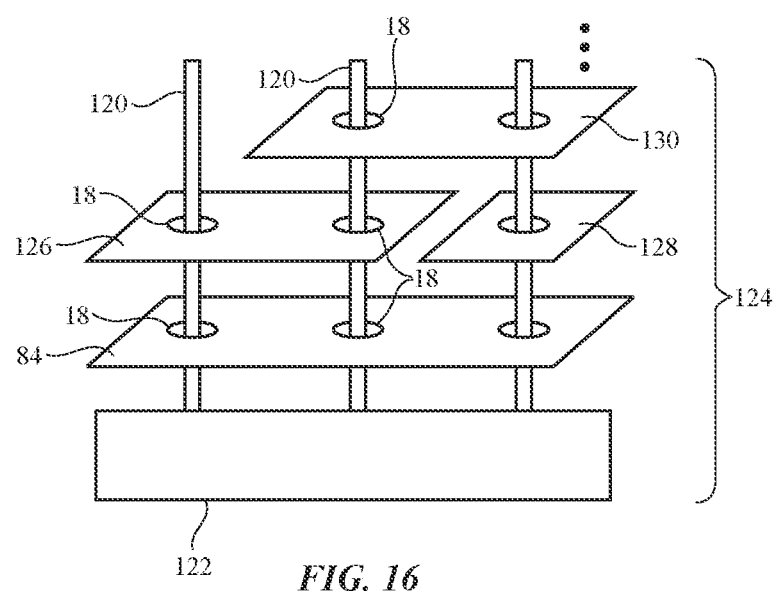
FIG. 16 is a side view of the illustrative non-adjustable fixture of FIG. 15 during assembly operations in which pieces of fabric and other structures with holes are fabricated and processed and placed on the no-adjustable fixture in accordance with an embodiment.

In the example of FIG. 16, four structures with holes have been placed on needles 120: layer 84, layer 126, layer 128, and layer 130. These layers may each have holes 18 that receive corresponding needles 120. While being held by fixture 124 in this way, these structures may be stitched together using stitching equipment 52. For example, stitching 16 may be formed (e.g., a chain-stitched seam) that joins each of the overlapping structures on needles 108 together.

In the example of FIG. 1, sidewall 14 of item 10 may be formed from a strip of circular knit fabric. The fabric may be transferred to adjustable fixture 50 and then transformed into a rectangular shape as shown in FIG. 13. Rectangular rear wall 12 may then be placed on pins 120 of fixture 124 so that each hole 18 in wall 12 is on the same needle 108 as a respective hole 18 on sidewall 14. After aligning holes 18 on rear wall 12 and sidewall 14 in this way, stitching equipment 52 may form a chain stitch (see, e.g., stitching 16 of FIG. 1) that joins rear wall 12 and sidewall 14 to form item 10.

Figure 17:
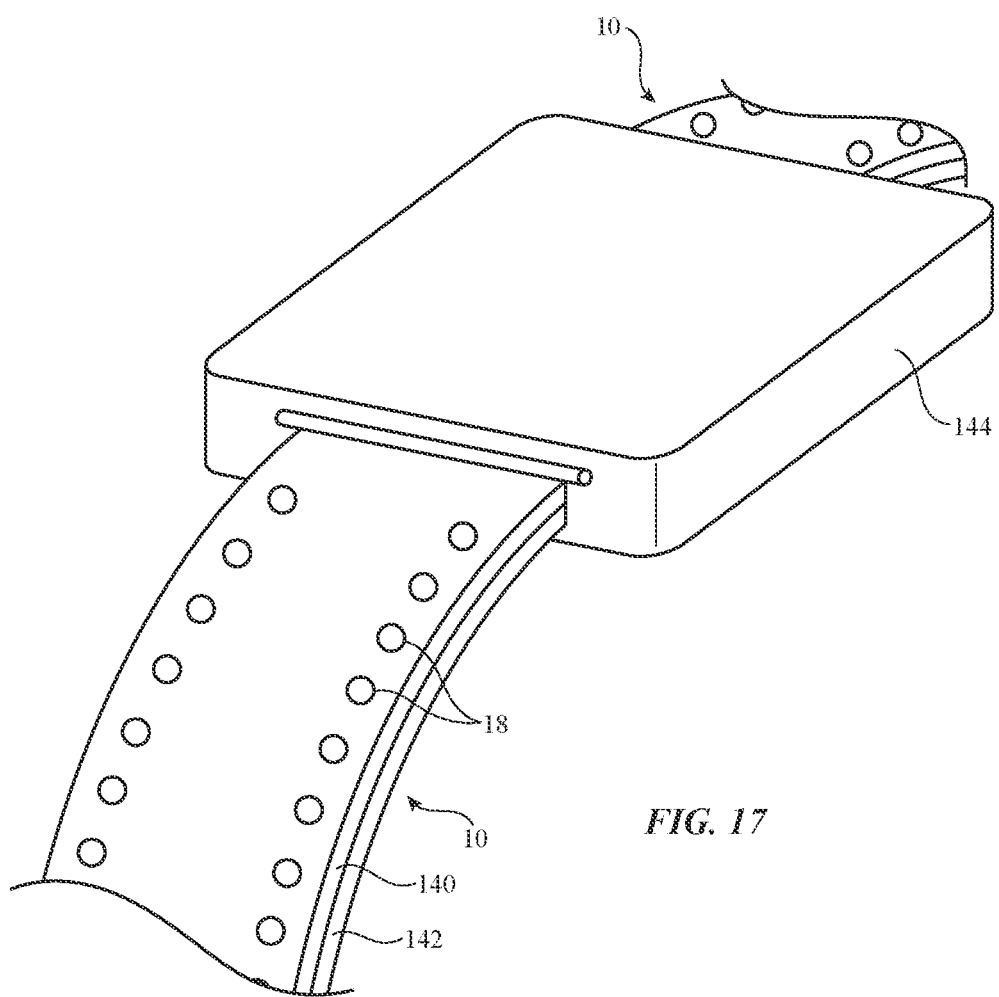
FIG. 17 is a perspective view of an illustrative watch having a band with multiple layers of material of the type that may be joined using equipment of the type shown in FIG. 5 in accordance with an embodiment.

Another illustrative example is shown in FIG. 17. In the illustrative configuration of FIG. 17, item 10 is a strap for a watch (e.g., a wrist watch having a main wrist watch unit 144 with a display, control circuitry, wireless communications circuitry, a battery, etc.). The strap may have an inner layer such a layer 142 (e.g., a fabric layer) and an outer layer such as layer 140 (e.g., a leather layer). Openings 18 may be joined using stitching 16.

Figure 18:
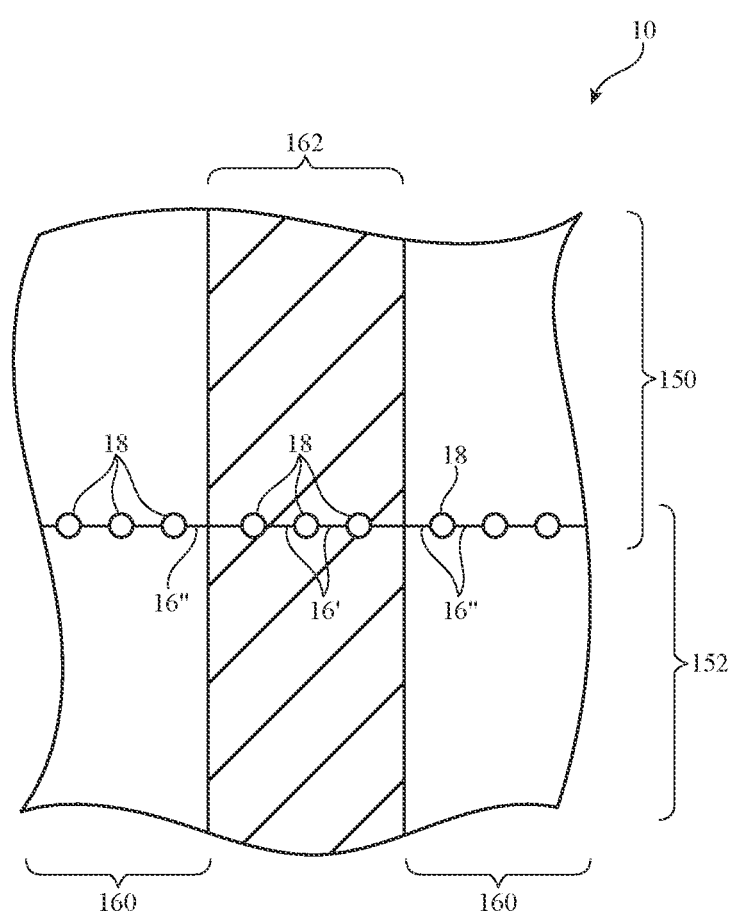
FIG. 18 is a top view of a seam formed between two layers of material with holes and aligned signal paths in accordance with an embodiment.

In some arrangements, layers of material being joined contain conductive structures. The conductive structures may, as an example, include signal lines. Signal lines can be formed from conductive strands of material (e.g., bare metal wire, polymer strands coated with metal, other conductive strands, etc.) and/or may be formed from metal traces that are deposited and patterned on fabric or other substrates using printing, physical vapor deposition, electrochemical deposition, etching, or other signal line formation patterning techniques. Consider, as an example, item 10 of FIG. 18. In the illustrative configuration of FIG. 18, a first layer of material (layer 150) has holes 18 that have been aligned with holes 18 in a second layer of material (layer 152). Layers 150 and 152 may be fabric layers, polymer layers, and/or other layers of material. Conductive path 162 (e.g., conductive strands in fabric and/or metal traces supported by fabric or other substrate material) be formed among insulating portions 160 of layers 150 and 152. Path 162 may include a first portion on layer 150 that is joined to a second portion on layer 152 using a conductive portion of stitching 16 (portion 16'). Portion 16' may be formed from a conductive strand or a conductive portion of an insulating strand. The remainder of the seam may be formed from insulating stitching 16" (e.g., an insulating portion of the strand containing conductive portion 16' or a separate insulating strand). In this way, a series of parallel conductive paths 162 can be joined to corresponding parallel conductive paths 162 in another layer of material without forming undesirable short circuits between laterally adjacent paths.

Figure 19:
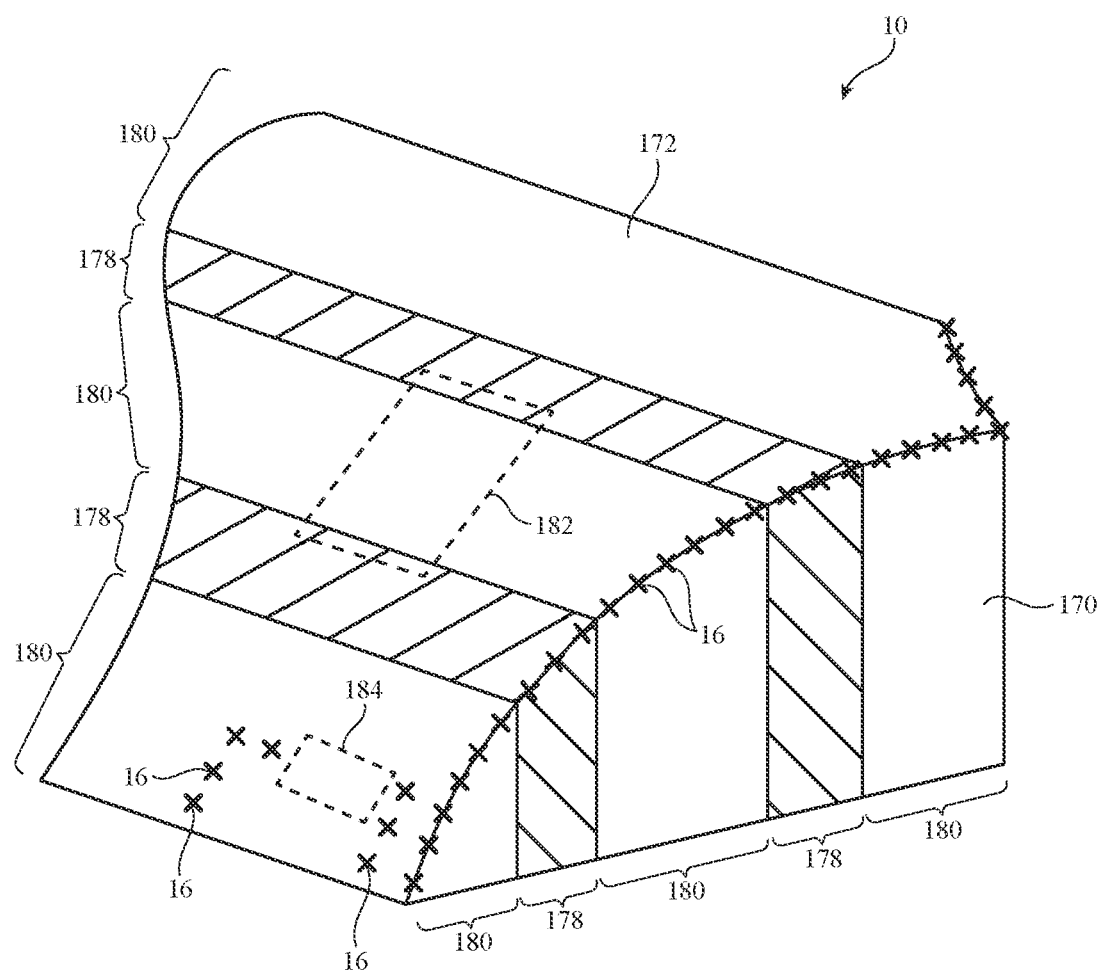
FIG. 19 is a perspective view of a three-dimensional seam formed between two structures with holes in accordance with an embodiment.

Another illustrative arrangement for item 10 is shown in FIG. 19. In the example of FIG. 19, adjustable fixture 50 has been adjusted to join first layer 170 and second layer 172 with stitching 16 (the seam between layers 170 and 172) having a desired three-dimensional shape. Electrical components such as component 182 may have contacts (terminals) that are electrically coupled to respective signal paths 178 (e.g., conductive traces such as metal traces, conductive strands in fabric, etc.) that are separated by insulating portions 180 of layers 170 and 172. Electrical components such as component 184 may have contacts that are electrically coupled to a signal path formed from stitching 16 (e.g., with or without forming a seam between layers 170 and 172). Components such as electrical components 182 and 184 may be integrated circuits, light-emitting diodes, sensors, and/or other circuitry for item 10. Stitching 16 that is coupled to components such as component 184 directly may be formed from conductive material to form a signal path. Stitching 16 that runs along a seam and that overlaps conductive paths 178 may be conductive in the portions that overlap paths 178 (thereby shorting mating portions of paths 178 together) and may be insulating in the portions that overlap insulating portions 180 to help avoid shorting adjacent parallel paths 178 together.

The foregoing is merely illustrative and various modifications can be made to the described embodiments. The foregoing embodiments may be implemented individually or in any combination.

What is claimed is:

1. A method of forming an item, comprising:
 placing first holes in a first layer of material on respective needles in a bed of needles in an adjustable-shape fixture;
 with positioning equipment, changing the shape of the bed of needles in the adjustable-shape fixture from a first shape to a second shape; and
 stitching together the first layer of material and a second layer of material with second holes while the first layer of material has a shape that follows the second shape by passing a strand of material through the first holes and the second holes.

2. The method defined in claim 1 further comprising:
 forming the first layer of material by knitting the first layer of material, wherein the first holes are formed from knit loops in the first layer of material.

3. The method defined in claim 2 further comprising:
 forming the second layer of material by knitting the second layer of material, wherein the second holes are formed from knit loops in the second layer of material.

4. The method defined in claim 3 wherein the first shape is a line and wherein the second shape is a rectangle.

5. The method defined in claim 4 wherein the first layer of material is a rectangular rear wall in an electronic device cover.

6. The method defined in claim 5 wherein the second layer of material is a strip of material forming sidewalls for the electronic device cover.

7. The method defined in claim 1 wherein the adjustable-shape fixture has hinged links that each support a respective one of the needles.

8. The method defined in claim 7 wherein the first layer of material and the second layer of material comprise knitted layers.

9. The method defined in claim 1 wherein stitching together the first layer of material and the second layer of material comprises forming a chain stitch from the strand of material.

10. The method defined in claim 1 wherein stitching together the first layer of material and the second layer of material comprises forming a stitch along a seam between the first and second layers of material in a three-dimensional seam shape.

11. The method defined in claim 1 wherein the strand of material comprises a conductive strand.

12. The method defined in claim 1 wherein the positioning equipment comprises computer-controlled positioning equipment.

13. The method defined in claim 1 wherein the positioning equipment comprises manually actuated positioning equipment.

14. A method of forming an item, comprising:
 placing a first layer of material on needles in a bed of needles in an adjustable-shape fixture;
 changing the shape of the bed of needles in the adjustable-shape fixture from a first shape to a second shape; and stitching together the first layer of material and a second layer of material while the first layer of material has a shape that follows the second shape.

15. A method of forming an item, comprising:
positioning first and second layers of material by placing first holes in a first signal path portion of the first layer of material on respective needles in a bed of needles and by placing second holes in a second signal path portion of the second later of material in the bed of needles so that the first holes overlap the second holes; and
stitching the first layer of material to the second layer of material with stitches formed from a strand of material that has conductive and insulating segments and that passes through the first and second holes so that a first conductive structure in the first layer is coupled to a second conductive structure in the second layer via the conductive segment of the strand.

16. The method defined in claim 15 wherein:
the first layer of material is formed from a first fabric layer;
the second layer of material is formed from a second fabric layer; and
the conductive segment shorts the first signal path to the second signal path.

17. The method defined in claim 15 wherein the first layer of material is selected from the group consisting of: a fabric layer, a leather layer, and a polymer layer.

18. The method defined in claim 15 wherein the first layer of material comprises a polymer layer and wherein the first signal path portion comprises a metal trace on the polymer layer.

19. The method defined in claim 15 wherein the stitching includes a polymer strand.

20. The method defined in claim 15 wherein the stitch has a three-dimensional shape.

* * * * *